United States Patent

Tsubokura

(10) Patent No.: US 8,206,021 B2
(45) Date of Patent: Jun. 26, 2012

(54) LIQUID CRYSTAL DISPLAY DEVICE

(75) Inventor: Masaki Tsubokura, Mobara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 329 days.

(21) Appl. No.: 12/489,562

(22) Filed: Jun. 23, 2009

(65) Prior Publication Data

US 2009/0316065 A1     Dec. 24, 2009

(30) Foreign Application Priority Data

Jun. 23, 2008   (JP) ................................. 2008-163093

(51) Int. Cl.
*F21V 7/04*       (2006.01)
*G02F 1/1333*    (2006.01)
*G02F 1/1335*    (2006.01)

(52) U.S. Cl. ............................. 362/613; 349/58; 349/61

(58) Field of Classification Search .................... 349/70, 349/58, 61; 362/613; 345/102
See application file for complete search history.

(56) References Cited

U.S. PATENT DOCUMENTS

| 6,422,710 | B1 * | 7/2002 | Herzog et al. | ................... 362/23 |
| 2008/0231775 | A1 * | 9/2008 | Lee | ................................ 349/68 |

FOREIGN PATENT DOCUMENTS

| JP | 2002-15885 | 1/2002 |
| JP | 2006-324131 | 11/2006 |

* cited by examiner

*Primary Examiner* — Nathanael R Briggs

(74) *Attorney, Agent, or Firm* — Antonelli, Terry, Stout & Kraus, LLP.

(57) ABSTRACT

A liquid crystal display device including a liquid crystal display panel, a backlight chassis arranged on one surface side of the liquid crystal display panel, and a control circuit board mounted on a surface of the backlight chassis on a side opposite to a surface facing the liquid crystal display panel includes a plurality of fluorescent tubes arranged on a surface side of the backlight chassis facing the liquid crystal display panel, a light source arranged on the control circuit board, and a light guide guiding the light from the light source to the surface side of the backlight chassis facing the liquid crystal display panel.

12 Claims, 7 Drawing Sheets

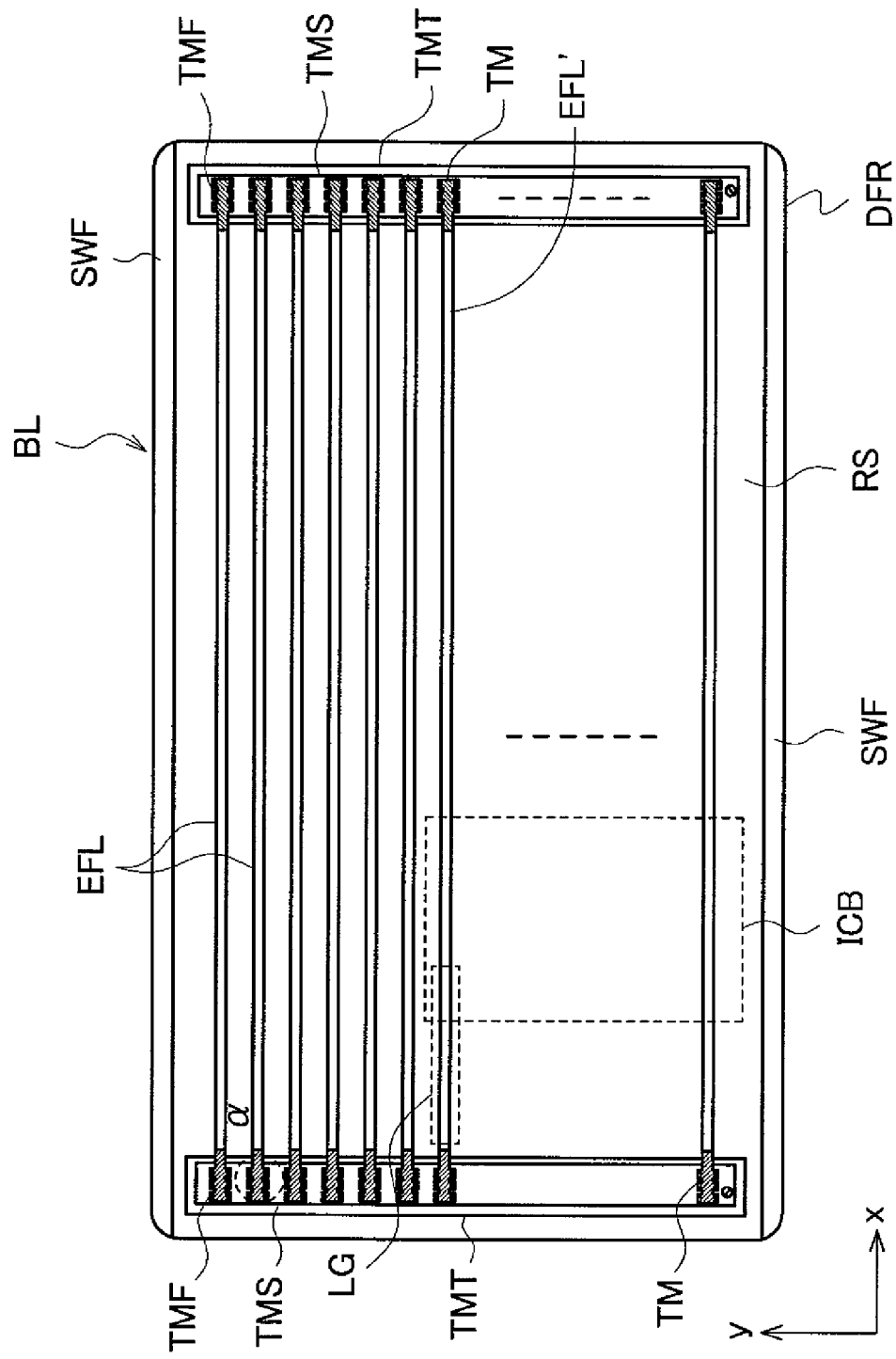

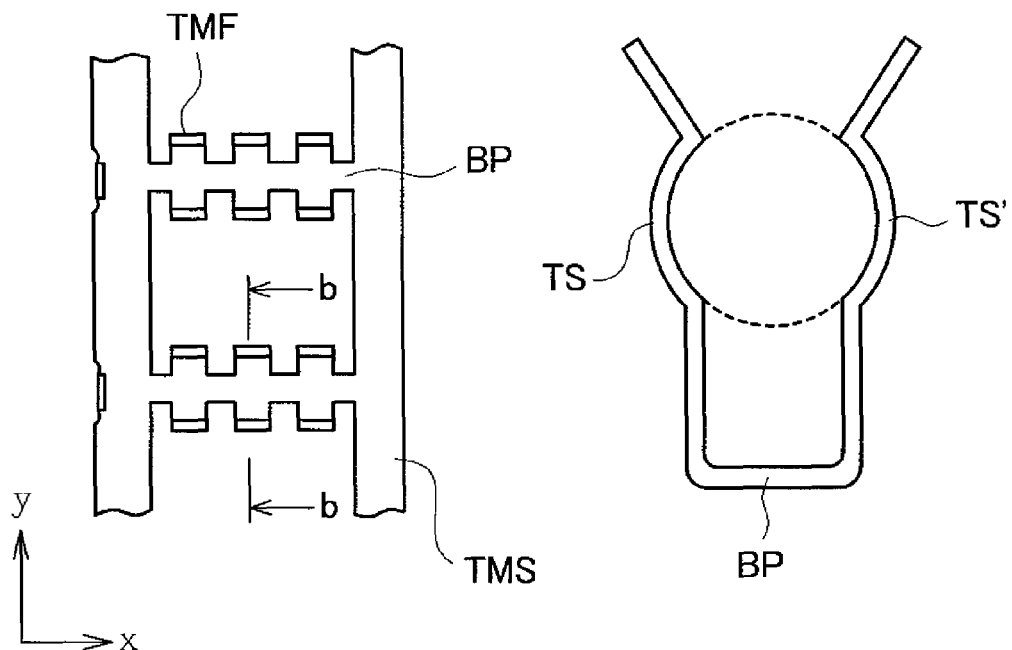
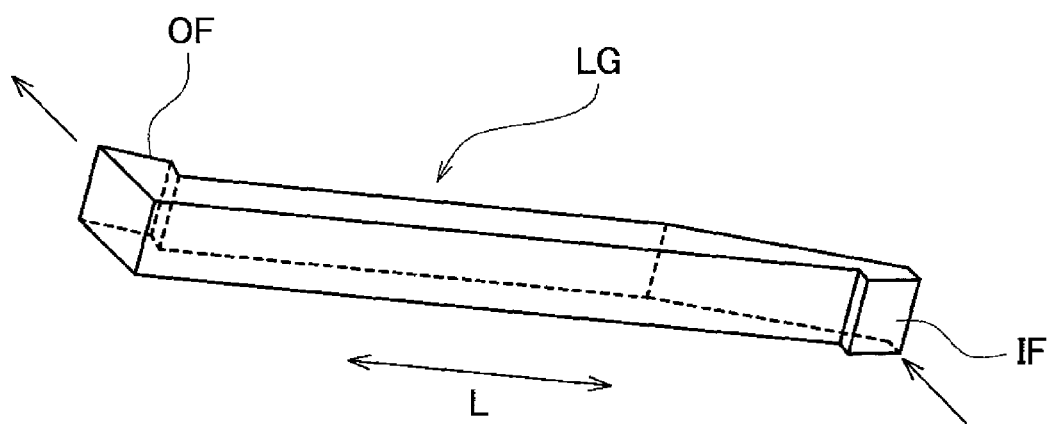

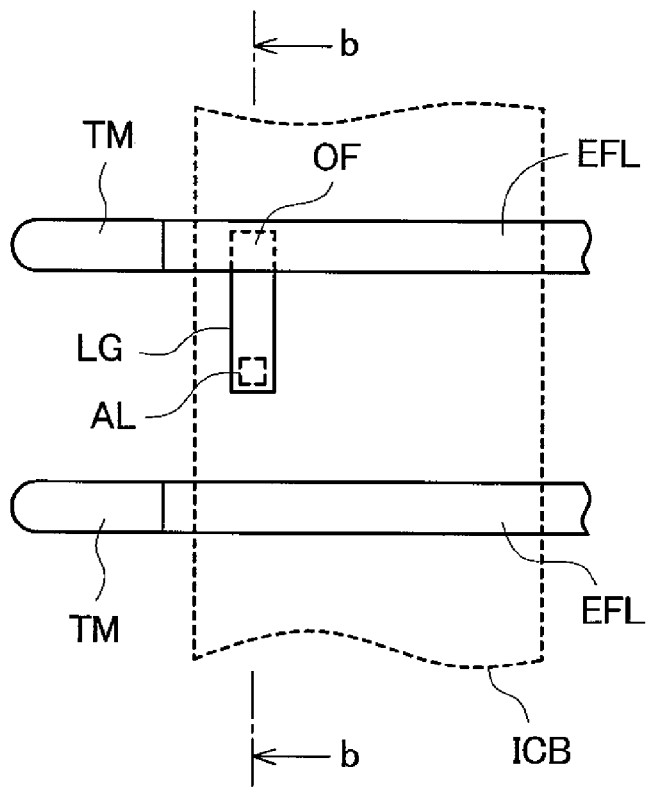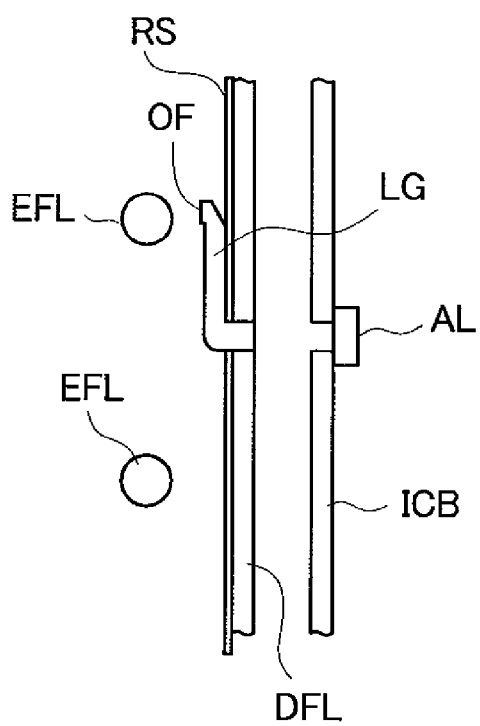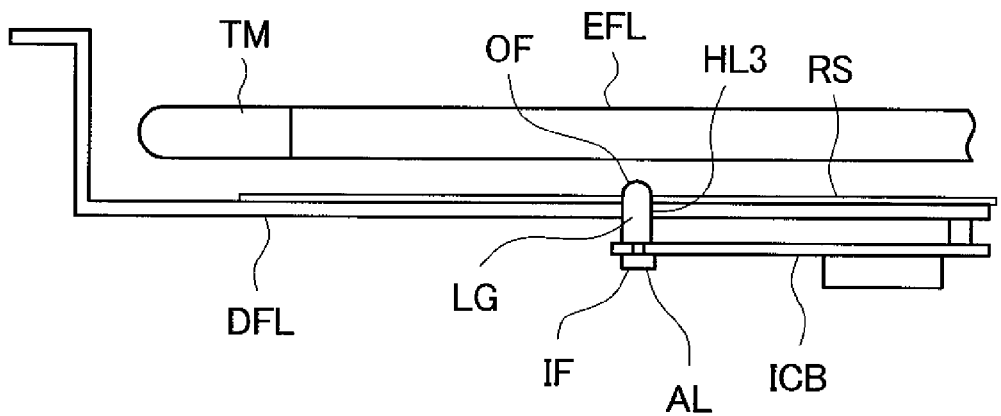

LIQUID CRYSTAL DISPLAY DEVICE

The present application claims priority from Japanese application JP2008-163093 filed on Jun. 23, 2008, the content of which is hereby incorporated by reference into this application.

BACKGROUND OF THE INVENTION

1. Field of the Invention

The present invention relates to a liquid crystal display device and more particularly to a liquid crystal display device including a backlight.

2. Background Art

Liquid crystal display panels are configured to control the light transmissivity in a pixel and therefore usually provided with a backlight at the back surface of the liquid crystal display panels.

The backlight generally uses a fluorescent tube (discharge tube) such as a cold cathode fluorescent lamp (CCFL) or external electrode fluorescent lamp (EEFL) as a light source.

The fluorescent tube used in the backlight has such a property that the fluorescent tube is immediately activated after being energized in a light area because initial electrons are produced by the ambient light in the tube but requires a long time to be activated in a dark area (refer to JP-A-2002-15885).

Therefore, a technique has been known in which an LED is arranged as an auxiliary light source in the vicinity of an electrode of the fluorescent tube, and the light from the LED is irradiated onto the fluorescent tube, so that the discharge of the fluorescent tube is smoothly started (refer to JP-A-2002-15885 and JP-A-2006-324131).

SUMMARY OF THE INVENTION

As for the mounting of the LED as an auxiliary light source, a specific form is not described in the related art. In the case of a liquid crystal display device having a relatively large, direct type backlight, such as for a television set, an inverter circuit board for controlling fluorescent tubes is arranged on the back surface (surface on the side opposite to the surface where the fluorescent tubes are arranged) of a backlight chassis in which the fluorescent tubes are arranged in parallel. Therefore, the actual mounting position of the auxiliary light source is on the inverter circuit board.

Further, in order to more effectively turning on the fluorescent tubes, it is desired that the auxiliary light source be arranged near the electrode of the fluorescent tube. Therefore, in the case of mounting the auxiliary light source on the inverter circuit board, the inverter circuit board must be arranged such that the auxiliary light source is right below the vicinity of the electrode of the fluorescent tube. Generally, since an electrode of a fluorescent tube is positioned outside a liquid crystal display region of a liquid crystal display panel, the arrangement of an inverter circuit board is limited only in a peripheral region of the backlight chassis. In liquid crystal television sets in recent years, a chassis of a television main body has been reduced in thickness. In addition to the above-described inverter circuit board, there are many boards to be arranged on the back surface of a backlight, including a power supply board. Therefore, some contrivance is necessary for the arrangement position of the boards along with the reduction in thickness of the television chassis. Since the reduction in thickness is especially required for the peripheral portion of the chassis, there is a demand that the boards be arranged close to the vicinity of the center. However, in the case of using an auxiliary light source, there is a problem that the demand is not satisfactorily met.

In addition, in order to irradiate the light from an auxiliary light source from the back surface of a backlight onto a fluorescent tube side, a hole must be formed through the backlight chassis. Generally, a reflective sheet is arranged on the surface of the backlight chassis on the fluorescent tube side, and the reflective sheet has a disadvantage that a hole cannot be formed therethrough. Forming a hole through the reflective sheet creates the possibility of intrusion by a foreign material and can be a remote cause of a reduction in luminance.

A main object of the invention is to provide a liquid crystal display device capable of allowing a control board mounted with an auxiliary light source to have a degree of freedom in arrangement.

Another object of the invention is to provide a liquid crystal display device capable of achieving the main object while preventing a foreign material from entering a backlight.

Typical outlines of the invention disclosed herein will be briefly described below.

A liquid crystal display device including a liquid crystal display panel, a backlight chassis arranged on one surface side of the liquid crystal display panel, and a control circuit board mounted on a surface of the backlight chassis on a side opposite to a surface facing the liquid crystal display panel includes a plurality of fluorescent tubes arranged on a surface side of the backlight chassis facing the liquid crystal display panel, a light source arranged on the control circuit board, and a light guide guiding the light from the light source to the surface side of the backlight chassis facing the liquid crystal display panel.

The configuration described above is only an example. The invention can be appropriately modified within a range not departing from the technical idea thereof. Configuration examples of the invention other than the configuration described above will be apparent from the description of the entire specification and the drawings.

The thus configured liquid crystal display device can allow a control board mounted with an auxiliary light source to have a degree of freedom in arrangement. In addition, the liquid crystal display device can achieve the main object while preventing a foreign material from entering a backlight.

Other effects of the invention will be apparent from the description of the entire specification.

BRIEF DESCRIPTION OF THE DRAWINGS

FIG. 3B is a plan view showing the configuration of the backlight of the liquid crystal display device of the first embodiment of the invention, showing a state where the side wall plates SWB are removed;

FIGS. 4A and 4B are configuration views showing the configuration of an electrode fitting provided in the backlight;

FIG. 5 is a perspective view showing the configuration of a light guide provided in the backlight;

FIGS. 8A and 8B are configuration views of a liquid crystal display device of a fourth embodiment of the invention;

FIG. 9 is a cross sectional view of a liquid crystal display device of a fifth embodiment of the invention.

DESCRIPTION OF THE PREFERRED EMBODIMENTS

Figure 1:
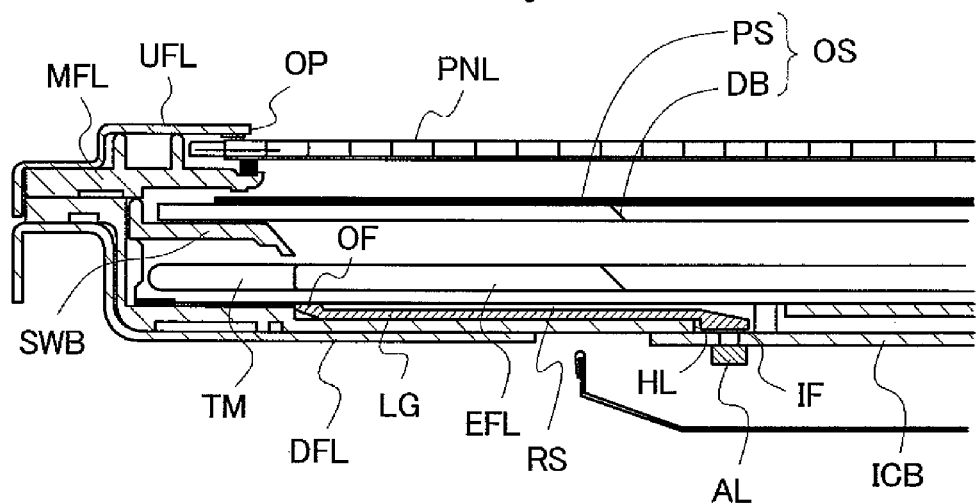
FIG. 1 is a cross sectional view of a liquid crystal display device of a first embodiment of the invention.

Embodiments of the invention will be described with reference to the drawings. In the drawings and embodiments, the same reference numerals and signs are assigned to the same or similar constituent elements, and the description thereof is omitted.

First Embodiment

Overall Configuration

Figure 2:
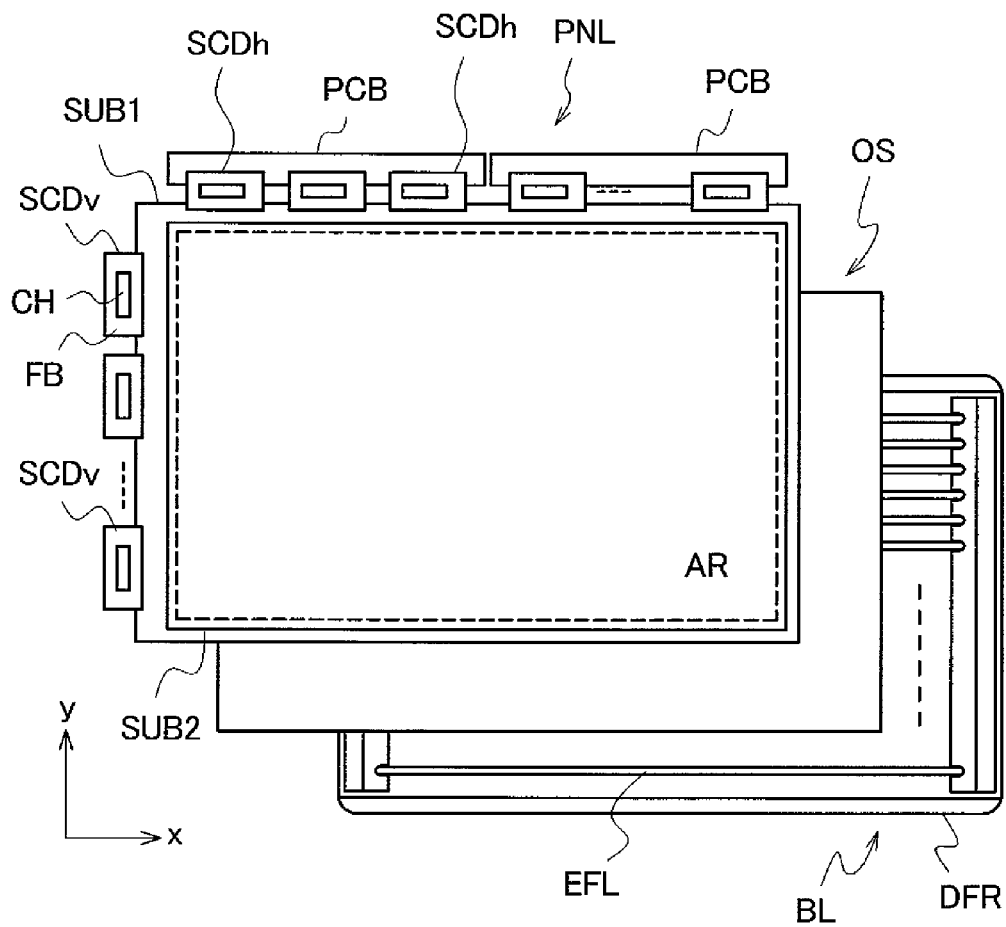
FIG. 2 is a schematic configuration view of the liquid crystal display device of the first embodiment of the invention.

FIG. 2 is a schematic configuration view showing an embodiment of a liquid crystal display device to which the invention is applied.

First, a liquid crystal display panel PNL, an optical sheet OS, and a backlight BL are sequentially arranged from the viewer's side.

The liquid crystal display panel PNL includes a pair of substrates SUB1 and SUB2 made of, for example, glass and arranged in parallel as an outer casing and liquid crystal interposed between the substrates SUB1 and SUB2.

Pixels (not shown) arranged in a matrix with liquid crystal as one constituent element are formed on surfaces of the substrates SUB1 and SUB2 on the liquid crystal side, so that the light transmissivity of the liquid crystal can be controlled for each pixel.

A region where the pixels are formed is defined as a liquid crystal display region AR (region surrounded by the dashed-dotted line in the drawing). The light from the backlight BL, which will be described later, is irradiated onto the entire area of the liquid crystal display region AR, so that a video image can be recognized by a viewer through the light passing through each of the pixels.

The substrate SUB1 arranged rearward with respect to a viewer has portions exposed from the substrate SUB2 on the left and upper sides thereof in the drawing, for example, and is connected with each one side portion of a plurality of semiconductor devices SCDh and SCDv in the exposed portions. The semiconductor devices SCDh and SCDv are formed by a so-called tape carrier method, and includes a semiconductor chip CH mounted on an upper surface of a flexible board FB formed with wiring.

Each of the semiconductor devices SCDh and SCDv is a circuit driving each pixel independently. For example, the semiconductor devices SCDv arranged in parallel in the y-direction in the drawing are scanning signal drive circuits, while the semiconductor devices SCDh arranged in parallel in the x-direction in the drawing are video signal drive circuits.

The plurality of semiconductor devices SCDh which are the video signal drive circuits are connected with printed boards PCB on another side facing the side connected to the substrate SUB1, and input with an external input signal through the printed board PCB.

The plurality of semiconductor devices SCDv which are the scanning signal drive circuits are not provided with a board corresponding to the printed board PCB because an external input signal is input thereto through wiring (not shown) formed on the surface of the substrate SUB1.

On the back surface of the thus configured liquid crystal display panel PNL, the backlight BL is arranged via the optical sheet OS formed of a stacked body of, for example, a prism sheet, a diffuser, and the like. The optical sheet OS guides the light from the backlight BL to the liquid crystal display panel PNL side while diffusing or condensing the light.

The backlight BL is referred to as a so-called direct type backlight and includes a plurality of fluorescent tubes EFL arranged in parallel in a box-shaped chassis (lower frame DFR).

The liquid crystal display panel PNL, the optical sheet OS, and the backlight BL are modularized with an upper frame UFL and a middle frame MFL which are fitted with the lower frame DFR and shown in FIG. 1.

(Backlight BL)

Figure 3A:
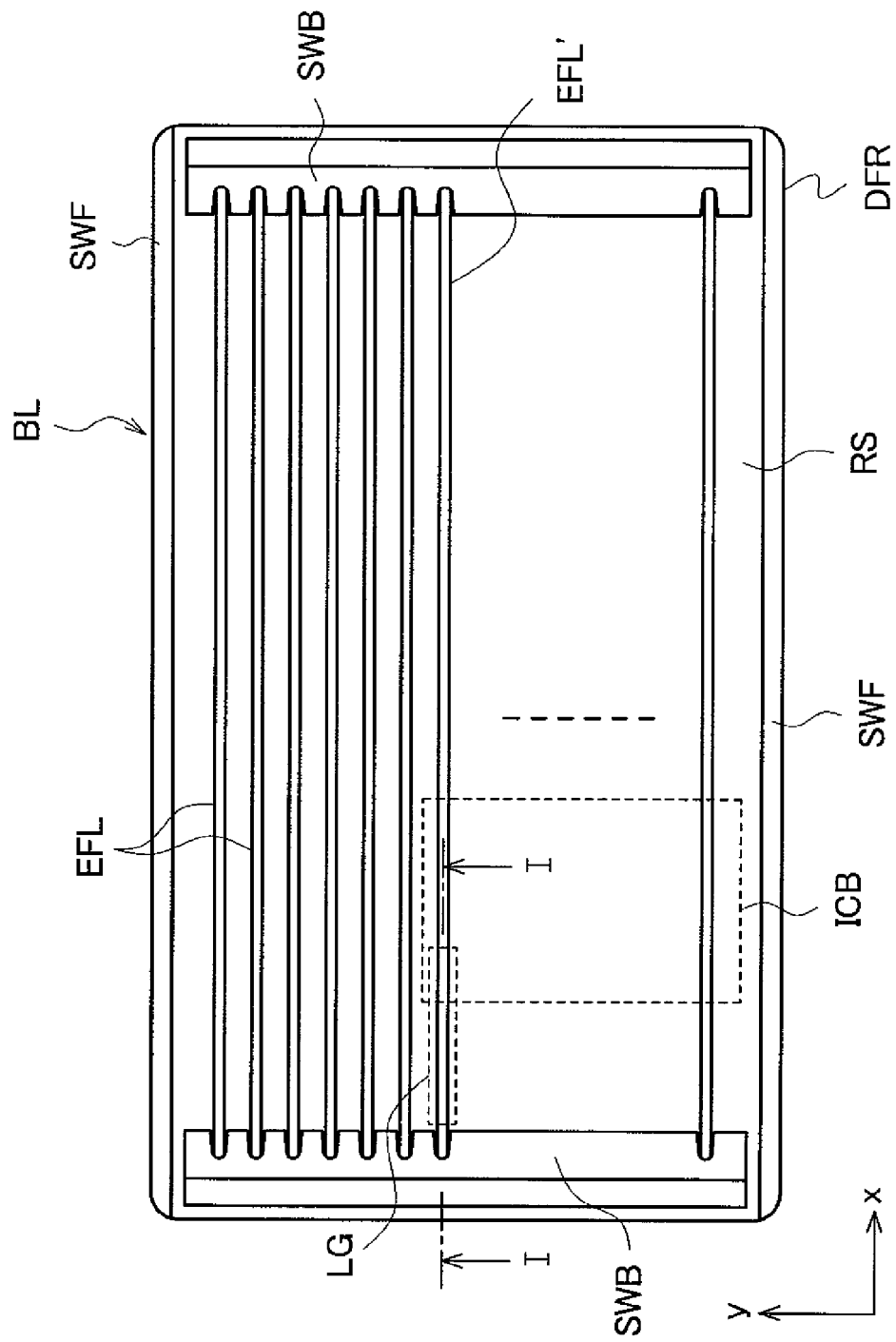
FIG. 3A is a plan view showing the configuration of a backlight of the liquid crystal display device of the first embodiment of the invention, showing a state where side wall plates SWB are attached.

FIG. 3A extracts and shows only the backlight BL of the liquid crystal display device shown in FIG. 2. FIG. 3B corresponds to FIG. 3A, showing a state where side wall plates SWB shown in FIG. 3A are removed.

A reflective sheet RS is placed on a surface of the lower frame DFR facing the liquid crystal display panel PNL, whereby a light reflecting surface is formed. Side portions which are parallel to the x-direction in the drawing in the reflective sheet RS each form a side wall surface SWF which is formed by bending the periphery so as to be high. As the reflective sheet RS used in the embodiment, a reflective sheet to which a black sheet is bonded on the back surface (surface on the lower frame DFR side) is not used, but a reflective sheet whose both surfaces are white is desirably used. The reason will be described later.

The fluorescent tubes EFL are arranged in parallel in plural numbers in the y-direction in the drawing in a plane parallel to the liquid crystal display panel PNL with the longitudinal direction of the fluorescent tubes coinciding with the x-direction in the drawing. In the embodiment, EEFLs are used for the fluorescent tubes EFL. The fluorescent tube EFL has at both ends thereof electrodes (refer to FIG. 3B) arranged outside the liquid crystal display region AR of the liquid crystal display panel PNL. The electrodes are covered by the side wall plates SWB arranged at the side portions which are parallel to the y-direction in the drawing in the lower frame DFR.

The side wall plate SWB is inclinedly arranged so that an outer side is high with respect to the liquid crystal display region AR and applied with a light reflection treatment on the surface on the liquid crystal display panel PNL side. The side wall plates SWB constitute substantial side wall portions of the backlight BL together with the side wall surfaces SWF of the reflective sheet RS.

Electrode supporting bases TMT are placed on the upper surface of the lower frame DFR where the side wall plates SWB are arranged, and electrode supporting members TMS are fixed on the electrode supporting bases TMT. The electrode supporting members TMS are located at the both ends of the fluorescent tubes EFL arranged in parallel and formed of metal sheets extending in the parallel-arranged direction of the fluorescent tubes EFL. The electrode supporting member TMS includes electrode fittings TMF for power supply which also serve to support electrodes TM of the fluorescent tubes EFL.

FIG. 4A is an enlarged view in the dotted frame α in FIG. 3B, showing the detail of the electrode fittings TMF. FIG. 4B is a cross sectional view taken along line b-b in FIG. 4A.

The electrode fittings TMF are formed integrally with the electrode supporting member TMS by stamping. Three electrode fittings TMF are arranged and formed in parallel along a base member BP of the electrode supporting member TMS, the base member BP extending in the x-direction in the drawing. That is, an identical electrode of the fluorescent tube EFL is supported by the three electrode fittings TMF. As shown in FIG. 4B, the electrode fitting TMF includes a pair of tongue pieces TS and TS' facing each other and sandwiching the electrode TM of the fluorescent tube EFL from both sides on the base member BP. Dotted circle shown in FIG. 4B shows the outer circumference of the electrode TM of the fluorescent tube EFL.

Returning to FIGS. 3A and 3B, an inverter circuit board ICB is attached to the lower frame DFR. The inverter circuit board ICB is attached on the back surface of the lower frame DFR (surface on the side opposite to the surface where the fluorescent tubes are arranged) and positioned slightly near the center of the lower frame DFR as shown in FIGS. 3A and 3B. The inverter circuit board ICB includes a control circuit which controls the turning on and off, luminance, and the like of the fluorescent tubes EFL and has an auxiliary light source mounted thereon for irradiating the fluorescent tubes EFL and formed of, for example, a light emitting diode, together with the control circuit. The auxiliary light source will be described later.

(Overall Configuration; Cross Sectional Shape)

FIG. 1 is a cross sectional view showing the modularized liquid crystal display panel PNL, optical sheet OS, and backlight BL taken along line I-I in FIG. 3A.

As shown in FIG. 1, a diffuser DB and a prism sheet PS are placed on the side wall plate SWB of the backlight BL. The diffuser DB and the prism sheet PS constitute the optical sheet OS shown in FIG. 2. The diffuser DB and the prism sheet PS are arranged between the middle frame MFL and the side wall plate SWB. The liquid crystal display panel PNL is placed on the middle frame MFL and is arranged between the middle frame MFL and the upper frame UFL. The upper frame UFL is formed with an opening OP for exposing the liquid crystal display region AR of the liquid crystal display panel PNL and fitted to the middle frame MFL or the lower frame DFL.

As described above, the inverter circuit board ICB is attached to the back surface of the lower frame DFL. The auxiliary light source AL is mounted on the inverter circuit board ICB. A light emitting diode (LED) is used for the auxiliary light source AL in the embodiment. For example, the auxiliary light source AL is arranged right below a fluorescent tube EFL' near the center, which is shown in FIGS. 3A and 3B. The inverter circuit board ICB is formed with a hole so that the light from the auxiliary light source AL is emitted to the fluorescent tube EFL' side. The light from the auxiliary light source AL is guided to the vicinity of the electrode TM of the external electrode fluorescent tubes EFL' by a light guide LG arranged between the reflective sheet RS and the lower frame DFL and irradiated onto the vicinity of the electrode TM.

FIG. 5 is a perspective view, extracting and showing only the light guide LG. For example, the light guide LG is formed of a transparent bar-like body composed of a synthetic resin molded material, and has a light incident end face IF at one end side and a light emitting end face OF at the other end side. The light incident end face IF and the light emitting end face OF are formed so as to face opposite to each other in a direction perpendicular to an extending direction L of the light guide LG. The light guide LG is formed into a shape such that when light is incident from the light incident end face IF, the light is totally reflected repetitively in the light guide LG to be emitted from the light emitting end face OF.

Returning to FIG. 1, the light guide LG is arranged at a position where the light incident end face IF thereof faces the auxiliary light source AL via the hole HL formed through the lower frame DFL. The light emitting end face OF of the light guide LG faces the fluorescent tube EFL' side and is arranged in the vicinity of the electrode TM of the fluorescent tube EFL'. The reflective sheet RS used in the embodiment is an entire white sheet without a light shielding film on its back surface. Therefore, the light emitted from the light emitting end face OF of the light guide LG can pass through the reflective sheet RS and reach the fluorescent tube EFL.

With the configuration described above, the inverter circuit board ICB mounted with the auxiliary light source AL can be arranged not right below the electrode of the fluorescent tube but close to the center side of the backlight.

Further, the inverter circuit board ICB can be arranged at a location according to the length of the light guide LG by forming the light guide LG while adjusting its length. Therefore, the inverter circuit board ICB is allowed to have a degree of freedom in arrangement.

In the embodiment, the light emitting end face OF of the light guide LG is arranged to face the reflective sheet RS, so that the light from the light emitting end face OF passes through the reflective sheet RS to be emitted to the fluorescent tube EFL side. Accordingly, it is not necessary to provide a hole in the reflective sheet RS, whereby a foreign material can be prevented from entering the backlight BL.

However, the configuration is not limited to the above one. A hole may be formed through the reflective sheet RS, and the light emitting end face OF of the light guide LG may be arranged at the position of the hole. With this configuration, a stronger light can be irradiated onto the fluorescent tube EFL. Further, when the hole and the light emitting end face OF are formed to have substantially the same size, the hole is covered by the light guide LG, whereby the probability that a foreign material enters the backlight BL can be reduced.

Second Embodiment

Figure 6:
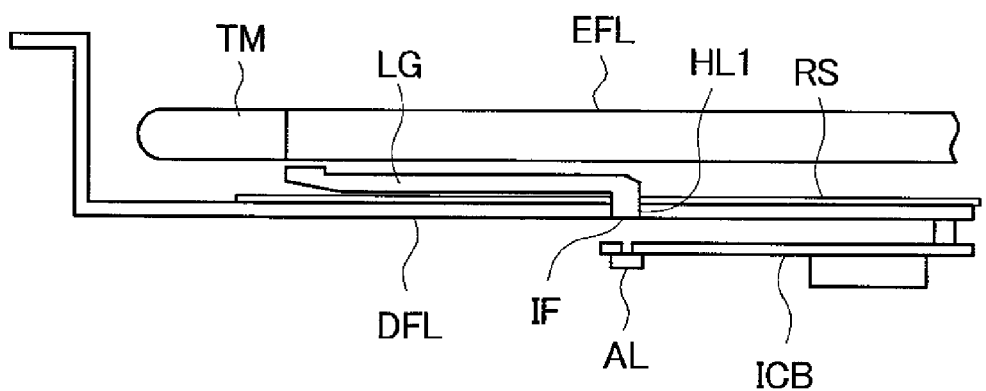
FIG. 6 is a cross sectional view of a liquid crystal display device of a second embodiment of the invention.

FIG. 6 shows the configuration of a second embodiment of the invention, corresponding to FIG. 1. In FIG. 6, however, the liquid crystal display panel PNL, the optical sheet OS, and the like are omitted, and the lower frame DFL is shown in a simplified manner, compared with FIG. 1.

The configuration of FIG. 6 is different from that of FIG. 1 in that the light guide LG is arranged on the upper surface of the reflective sheet RS. A hole HL1 is formed through the reflective sheet RS and the lower frame DFL, the light incident end face IF side of the light guide LG is arranged in the hole HL1, and the light incident end face IF faces the auxiliary light source AL mounted on the inverter circuit board ICB.

In this case, even when the hole HL1 is formed through the reflective sheet RS and the lower frame DFL, the light incident end face IF side of the light guide LG is configured so as to be fitted to the hole HL1 to cover the hole HL1 by the light guide LG. Therefore, a foreign material can be prevented from entering the backlight BL. The same thing applies to configurations of third and subsequent embodiments.

Third Embodiment

Figure 7:
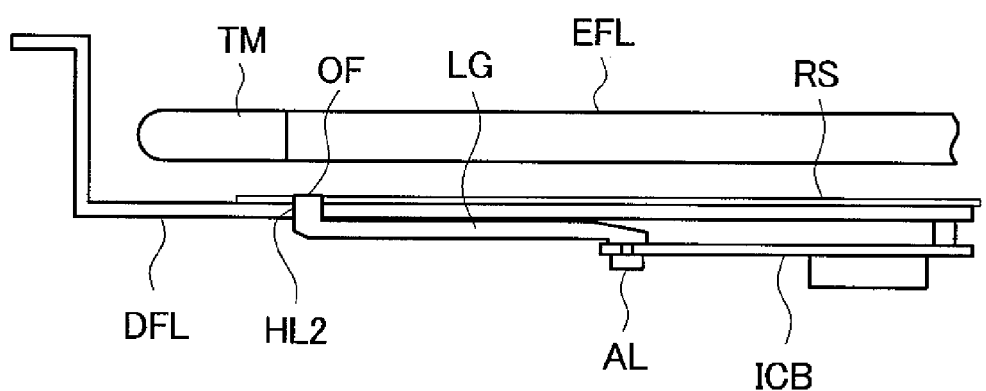
FIG. 7 is a cross sectional view of a liquid crystal display device of a third embodiment of the invention.

FIG. 7 shows the configuration of a third embodiment of the invention, corresponding to FIG. 6.

The configuration of FIG. 7 is different from that of FIG. 6 in that the light guide LG is arranged on the back surface of the lower frame DFL. A hole HL2 is formed through the lower frame DFL and the reflective sheet RS, the light emitting end face OF side of the light guide LG is arranged in the hole HL2, and the light emitting end face OF faces the electrode TM side of the fluorescent tube EFL.

In this case, when the inverter circuit board ICB is attached to the same place as in FIG. 6, the light guide LG having the same shape as the light guide LG used in FIG. 6 can be used. That is, the light guide LG shown in FIG. 7 and the light guide LG shown in FIG. 6 are in such a relationship that the former is obtained by reversing the latter right and left and turning the same upside down.

Fourth Embodiment

FIG. 8A is a plan view showing the configuration of a fourth embodiment of the invention. FIG. 8B is a cross sectional view taken along line b-b in FIG. 8A.

As viewed in a plane, the inverter circuit board ICB is arranged such that the auxiliary light source AL mounted thereon is positioned between adjacent fluorescent tubes EFL.

In this case, the light guide LG is arranged with the longitudinal direction thereof coinciding with a direction intersecting the fluorescent tubes EFL, and the light emitting end face OF of the light guide LG is positioned right below the fluorescent tube EFL.

In this case, the light guide LG which is short compared with the light guides LG shown in the first to third embodiments can be used.

Fifth Embodiment

FIG. 9 is a plan view showing the configuration of a fifth embodiment of the invention. The light guide LG used in the embodiment has a shape extending perpendicular to a plane including the plurality of fluorescent tubes EFL.

That is, the light guide LG is arranged to penetrate through a hole HL3 formed through the lower frame DFL and the reflective sheet RS, and the light incident end face IF and the light emitting end face OF of the light guide LG are in the same position as viewed in a plane.

In the case where the inverter circuit board ICB is arranged relatively close to the electrode TM of fluorescent tube EFL, the light of the auxiliary light source AL can be guided to the fluorescent tube EFL side without attenuating the light.

In this case, the light emitting end face OF of the light guide LG is formed into a spherical shape, whereby the light from the light emitting end face OF can be reliably irradiated onto the electrode TM side of the fluorescent tube EFL. However, the light emitting end face OF may be flat.

Sixth Embodiment

Figure 10:
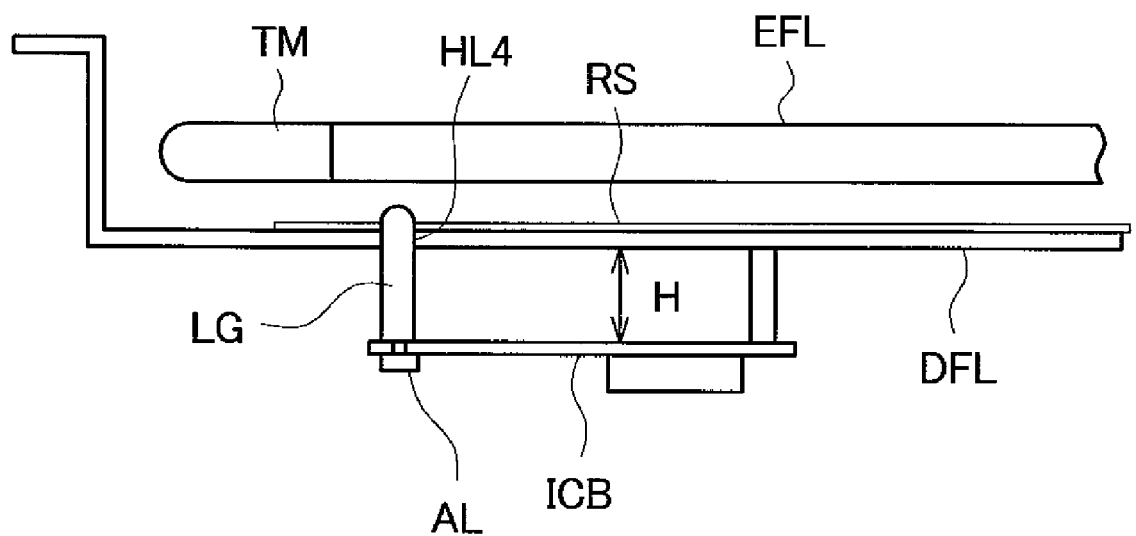
FIG. 10 is a cross sectional view of a liquid crystal display device of a sixth embodiment of the invention.

FIG. 10 is a plan view showing the configuration of a sixth embodiment of the invention, corresponding to FIG. 9.

FIG. 10 is different from FIG. 9 in that FIG. 10 shows the case where the inverter circuit board ICB is inevitably arranged at a relatively higher position (indicated by H in the drawing) than the surface of the lower frame DFL.

In this case, the light guide LG is formed long according to the height H and is arranged to penetrate through a hole HL4 formed through the lower frame DFL and the reflective sheet RS in the same manner as in FIG. 9.

With this configuration, the light of the auxiliary light source AL can be guided to the external electrode fluorescent tube EFL side without attenuating the light.

In the embodiments described above, although the fluorescent tube EFL has been described as an EEFL, this is not restrictive. The invention can be applied to the case of using other fluorescent tube, for example, a CCFL.

What is claimed is:

1. A liquid crystal display device including a liquid crystal display panel, a backlight chassis arranged on one surface side of the liquid crystal display panel, and a control circuit board mounted on a surface of the backlight chassis on a side opposite to a surface facing the liquid crystal display panel, comprising:
   a plurality of fluorescent tubes arranged on a surface side of the backlight chassis facing the liquid crystal display panel;
   an auxiliary light source arranged on the control circuit board; and
   a light guide guiding the light from the auxiliary light source to the surface side of the backlight chassis facing the liquid crystal display panel;
   wherein the light guide has a light incident end and a light emitting end, and the light emitting end is arranged in the vicinity of an electrode of the fluorescent tube; and
   wherein the light guide is a solid transparent member.

2. The liquid crystal display device according to claim 1, wherein
   a reflective sheet is arranged between the backlight chassis and the fluorescent tubes, and
   the light guide is arranged between the reflective sheet and the fluorescent tubes.

3. The liquid crystal display device according to claim 1, wherein
   a through hole is formed through the backlight chassis at a position where the light incident end of the light guide is arranged.

4. The liquid crystal display device according to claim 2, wherein
   the light guide is arranged such that the longitudinal direction of the light guide is in parallel with the longitudinal direction of the fluorescent tube.

5. The liquid crystal display device according to claim 2, wherein
   the light guide is arranged such that the longitudinal direction of the light guide intersects the longitudinal direction of the fluorescent tube.

6. The liquid crystal display device according to claim 1, wherein
   the light guide is arranged on a surface side of the backlight chassis where the control circuit board is arranged.

7. The liquid crystal display device according to claim 6, wherein a through hole is formed through the backlight chassis at a position where the light emitting end of the light guide is arranged.

8. The liquid crystal display device according to claim 1, wherein the light emitting end of the light guide has a spherical shape.

9. The liquid crystal display device according to claim 1, wherein the solid transparent member is formed of a resin material.

10. The liquid crystal display device according to claim 1, wherein the light incident end and the light emitting end of the light guide are disposed so as to face in opposite directions.

11. The liquid crystal display device according to claim 1, wherein the light emitting end of the light guide is arranged to enable light from the auxiliary light source to be directed to the fluorescent tube.

12. The liquid crystal display device according to claim 1, wherein the light emitting end of the light guide emits light directly onto a portion of the fluorescent tube.

* * * * *